Oct. 20, 1953     J. F. VON ESSEN     2,656,076

CONDIMENT SHAKER WITH NOVEL CLOSING CAP

Filed May 11, 1951

John F. Von Essen
INVENTOR.

Patented Oct. 20, 1953

2,656,076

UNITED STATES PATENT OFFICE 2,656,076

CONDIMENT SHAKER WITH NOVEL CLOSING CAP

John F. Von Essen, Floral Park, N. Y.

Application May 11, 1951, Serial No. 225,775

1 Claim. (Cl. 222—196.3)

The present invention relates to condiment holders and shakers and has more particular reference to a shaker for any dry granulated or equivalent powdered product, the principal novelty having to do with a unique cap construction having included therein ways and means for valving the discharge openings and, in addition, for agitating the powdered product.

It is a matter of common knowledge that the ordinary salt or equivalent shaker is characterized by a receptacle which functions as a holder and, for the most part, the receptacle is provided with a screw-threaded neck and a screw cap is applied by way of the neck. The cap has a multiplicity of pouring or shaking holes therein. Many and varied added accessories have been devised to agitate the contents and to prevent same from clogging and to insure effective shaking results once the shaker is inverted and handled in customary fashion.

More specifically, the invention has to do with what may be unitarily referred to as a readily insertable and removable cap and agitator assembly, the latter being characterized by a screw cap which is attachable to the open end of the receiver portion of the shaker construction, a complemental spider which is spaced from and in approximate parallelism with the cap, said spider and cap being centrally connected with each other by way of a center rod fixed at its respective ends to the cap and spider, said spider having guide openings in alignment with shaker openings in the cap. A plurality of circumferentially spaced additional rods are provided and these have end portions slidable through the guides in the spider and shaker openings in the cap in order that they may function as agitating elements. The outer ends of the thus performing agitator rods are formed with valve heads cooperable with the shaker openings to provide the desired valving results.

The obvious object of the invention is to structurally, functionally and otherwise improve upon prior art constructions in this category and, in so doing, to provide a structural adaptation in which manufacturers and users will find their essential requirements and needs fully met, contained and effectually available.

Other objects and advantages will become more readily apparent from the following description and the accompanying sheet of illustrative drawings.

In the accompanying sheet of drawings wherein like numerals are employed to designate like parts throughout the views.

Figure 1:
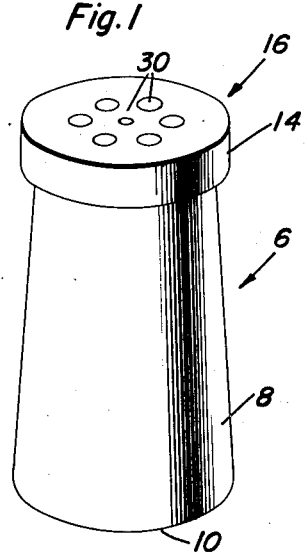
Figure 1 is a perspective view of a salt or equivalent shaker constructed in accordance with the principles of the present invention.

Referring now to the drawings by reference numerals it will be seen that the container or holder is an appropriate receiver or receptacle and this is denoted by the numeral 6 and has a cylindrical body portion 8 which may be slightly tapered if desired and a flat bottom 10. The upper restricted open end is provided with external screw threads 12 defining the usual screw-threaded neck. This neck is adapted to accommodate the internally screw-threaded rim or skirt 14 of the readily applicable and removable shaker-cap 16. The latter is provided, as best shown in Figure 3, with a plurality of shaker holes or openings 18 which have their outer portions counterbored and flared to provide valve seats 20. The cap 16 constitutes a part of a cap assembly and the latter (see Fig. 2) also includes as a part thereof a simple open-work component or unit which may be described as a spider 22. This has spokes 24 therein defining a plurality of sector-shaped passages 26 for the salt or other contents of the holder. The spider is rigidly mounted on one end of an axially arranged rigid roll 28 and, therefore, the spider is parallel to the cap. The upper or outer end of the rod 28 is rigidly secured as at 30 to the central portion of the cap. The assembly further includes a plurality of mushroom-type valves or valve heads 32 which are arranged and constructed to normally seat in and close the openings 18 by way of the accommodating valve seats 20. These valve elements or heads are on assembling and operating valve rods 34. Any number of rods are provided and these are shown in concentric circumferentially spaced relationship in respect to the center of the spider and the rod 28. The valve rods are slidable through guide openings provided therefor in the spokes 24 and the end portions 36 are provided with enlargements providing stop shoulders which are engageable with the normal underside of the spider to limit the opening positions of the valve heads or elements 32.

It will be seen that the essence of the invention has to do with the readily applicable and removable cap assembly characterized by a shaker cap and valving and agitating means carried by said cap. The cap may be the screw cap shown; or, it could be a screw plug to be screwed interiorly into the upper internally screw-threaded end of the holder (not shown). In any event, the structure claimed to be novel is characterized by a perforated screw or equivalent cap with the perforations having valve seats and valves cooperating with the seats, the valves being carried by rods and the valve rods being operable slidably and loosely through openings in a spider and the spider being joined to the cap by a central assembling rod.

Figure 2:
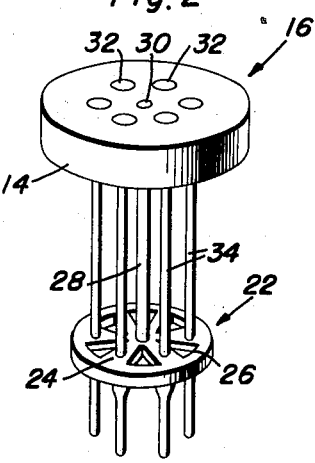
Figure 2 is a perspective view of a novel cap construction, this embodying the essential features of the invention.
Figure 3:
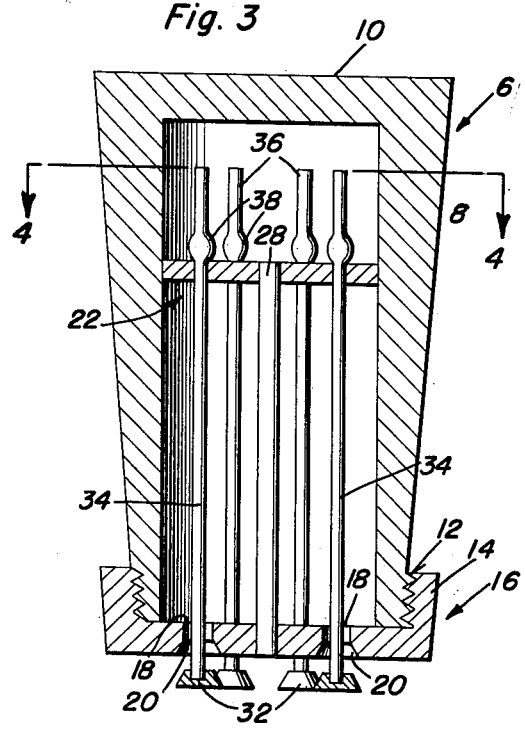
Figure 3 is an enlarged view in section and elevation showing the shaker inverted and in readiness for use with the plunger rods in projected valve-opening positions; and, Figure 4 is a horizontal or cross-section taken on the plane of the line 4—4 of Figure 3, looking in the direction of the arrows.
Figure 4:
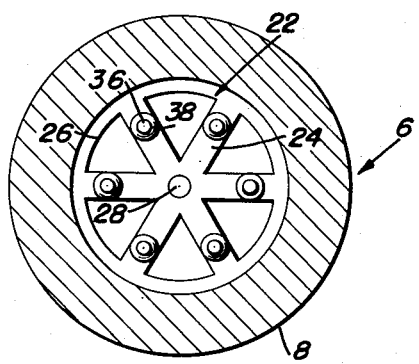

It is to be stressed that the invention has to do, as is evident, with the insertable and removable cap and agitating and valving assembly appearing best in Fig. 2. It is to be noted in this connection that the spider is spaced a considerable distance from the cap and the agitating and valving rods 34 are relatively long. It follows that when the cap is screwed in place the rod 28 positions the spider somewhere within the vicinity of the bottom of the salt containing chamber. Also since the inner end portions 36 of the rods 34 extend well through and beyond the openings in the spider it will be evident that the lower portion of said chamber is subject to the agitating effects of said end portions 36. This means that the salt or other contents of the receiver is agitated almost from top to bottom and hence the likelihood of clogging is reduced to an appreciable minimum.

It is understood, of course, that the structure disclosed is a satisfactory container and dispenser for all sorts of powdered products but may perhaps be properly comprehended merely as a condiment holder and more specifically as a salt shaker.

It is thought that persons skilled in the art to which the invention relates will be able to obtain a clear understanding of the invention after considering the description in connection with the drawings. Therefore, a more lengthy description is regarded as unnecessary.

Minor changes in the shape, size, materials and arrangement of parts may be resorted to in actual practice without departing from the spirit and scope of the invention, as claimed.

Having described the invention, what is claimed as new is:

For use in conjunction with the receiver of a condiment shaker construction, a readily applicable and removable valved cap and agitator assembly comprising, in combination, a receiver closing cap having shaker openings formed with valve seats, a spider disposed in spaced parallelism relative to said cap, a single rigid rod fixed at its outer end to a central portion of said cap and fixed at its inner end to a corresponding central portion of said spider, said spider having guide openings registering with the shaker openings in said cap, a plurality of valving and agitating rods, the outer end portions of said rods passing slidably through the shaker openings and having valve heads engageable with their respective valve seats, the inner ends of said rods passing slidably through guide openings in said spider and projecting to points well beyond the adjacent surface of the spider, the portions of the rods in close proximity to said adjacent surface of the spider being provided with stop shoulders and said shoulders being engageable with said spider when the valve heads are disengaged from said valve seats.

JOHN F. VON ESSEN.

References Cited in the file of this patent

UNITED STATES PATENTS

| Number | Name | Date |
| --- | --- | --- |
| 836,748 | Gallisath | Nov. 27, 1906 |
| 1,472,658 | Lindenmayer | Oct. 30, 1923 |
| 1,544,472 | Moore | June 30, 1925 |
| 1,592,035 | Massuere | July 13, 1926 |
| 2,179,624 | Graham | Nov. 14, 1939 |
| 2,185,896 | Jones | Jan. 2, 1940 |
| 2,205,040 | Kasin | June 18, 1940 |